United States Patent [19]

Smith et al.

[11] 4,440,582

[45] Apr. 3, 1984

[54] PROTECTIVE COATING COMPOSITION AND METHOD OF USE THEREFOR

[75] Inventors: Noel A. Smith; William J. Avallone, both of Troy, Mich.

[73] Assignee: Saran Protective Coating Company, Detroit, Mich.

[21] Appl. No.: 368,718

[22] Filed: Apr. 15, 1982

[51] Int. Cl.$^3$ .............................................. C10M 3/14
[52] U.S. Cl. ........................... 148/6.15 R; 106/14.15; 148/31.5; 148/6.15 Z
[58] Field of Search .................... 252/49.6, 396, 49.3, 252/49.5, 389 R; 106/14.31, 14.15, 14.22, 14.26, 14.13; 148/6.14 R, 31.5

[56] References Cited

U.S. PATENT DOCUMENTS

| | | | |
|---|---|---|---|
| 2,129,281 | 9/1938 | Lincoln | 252/49.6 |
| 2,528,535 | 11/1950 | Merker | 252/49.6 |
| 3,457,173 | 7/1969 | Pater | 252/49.3 |
| 3,625,895 | 12/1971 | Brown | 252/49.6 |
| 4,043,924 | 8/1977 | Traver | 252/49.5 |
| 4,074,011 | 2/1978 | Teramal | 148/6.15 R |
| 4,216,032 | 8/1980 | Hyner | 148/6.15 Z |
| 4,248,724 | 2/1981 | MacIntosh | 252/396 |

FOREIGN PATENT DOCUMENTS

0810782 3/1981 U.S.S.R. ............................. 252/49.5

*Primary Examiner*—Sam Silverberg
*Attorney, Agent, or Firm*—Basile, Weintraub & Hanlon

[57] ABSTRACT

Metal parts, such as bolts, fasteners, and the like having improved corrosion resistance are obtained by (a) phosphating the metal part and, thereafter (b) coating the metal with an aqueous coating composition consisting essentially of: (1) a phosphating oil, (2) a siloxane which is either a polyalkylsiloxane or an alkylpolysiloxane, and (3) water.

21 Claims, No Drawings

PROTECTIVE COATING COMPOSITION AND METHOD OF USE THEREFOR

BACKGROUND OF THE INVENTION

I. Field of the Invention

The present invention concerns coating compositions and methods of use therefor. More particularly, the present invention concerns coating compositions for rendering metallic parts corrosion resistant and methods of use therefor. Even more particularly, the present invention concerns coating compositions useful in rendering metallic parts resistant to salt spray corrosion and methods of use therefor.

II. Prior Art

The oxidation or rusting of metallic parts upon prolonged exposure to the elements is well documented. As an industrial problem, oxidation problems are manyfold. A particularly significant industrial problem occurs in the automotive industry when oxidation of metallic parts of a vehicle, such as bolts, nuts, etc. occur. First, there is the replacement problem. Oxidation or rusting, when coupled with galvanic welding, may make it virtually impossible to remove and replace a rusted bolt or nut, thereby necessitating the need to burn it off with a torch or similar tool. Likewise, a bolt or nut may become so oxidized as to break. This, in turn, can rupture or weaken a significant structural component thereby leading to potential injury and/or accident with the vehicle.

To alleviate the problem of rusting fasteners and other components of a vehicle, the automotive manufactuers have established certain minimum corrosion standards. Unless a fastener can meet these standards, it is unsuitable for use. The most common industry test is a salt spray corrosion test wherein a fastener is exposed to a salt spray atmosphere, for a pre-determined time. The extent of corrosion of the part after the predetermined time period determines if the part is acceptable or not.

Therefore, fasteners expected to meet automotive industry corrosion resistance standards have conventionally been treated with a phosphate solution, such as zinc phosphate or the like, in accordance with well-known techniques. Thereafter, the part is coated with a "phosphating oil" or other salt-resistant coating. Yet, such so-treated parts have great difficulty in passing corrosion-resistance tests. The present invention, thus, seeks to overcome this problem in the prior art by providing a coating composition for impairing corrosion resistance to metal fasteners and other parts which can successfully pass an automotive industry test. As will be evident from the ensuing disclosure, the composition hereof is distinct from prior art compositions. For example, U.S. Pat. No. 4,216,032 teaches an improved "phosphating oil" wherein an effective amount of polyvinylpyrrolidone and zinc powder is added to the oil.

SUMMARY OF THE INVENTION

In accordance with the present invention, there is provided a coating composition, particularly adapted for enhancing corrosion-resistance of metal fasteners and consisting essentially of:

(a) a phosphating oil, and
(b) a siloxane compound which is either an alkylpolysiloxane or a polyalkylsiloxane.

The composition hereof, which is an aqueous solution, generally, comprises from about 5% to 35%, by volume, of the phosphating oil and from about 0.1% to 25%, by volume, of the siloxane and the balance being substantially water. Preferably, the composition comprises from about 5 to 25%, by volume, of the oil and 0.1 to 10%, by volume, of the siloxane.

The coating composition, which is deployed as an aqueous solution thereof, is applied to a fastener or other metallic part, after being subjected to a phosphate treatment. The coating composition is applied at ambient conditions and by any suitable method, such as by spraying, brushing, immersion or the like.

Parts treated in accordance herewith have evidenced capability of surpassing a four hundred hour salt spray exposure test.

For a more complete understanding of the present invention, reference is made to the following detailed description and accompanying illustrative examples of the present invention.

DETAILED DESCRIPTION OF THE PREFERRED EMBODIMENTS

As hereinabove noted, the present invention provides a coating composition for rendering metal fasteners or other parts corrosion resistant and which, generally, comprises an aqueous solution of a mixture of:

(a) a "phosphating" oil, and
(b) a siloxane.

More specifically, the coating composition hereof comprises an aqueous solution having from about 5% to about 35%, by volume, of the oil and from about 0.1% to 25%, by volume, of the siloxane and the balance being substantially water. Preferably, the coating composition comprises from about 5% to about 25%, by volume, of the oil and from about 0.1% to about 10%, by volume, of the siloxane, with the balance being substantially water. Phosphating oils as is understood to those skilled in the art, defines a long chain aliphatic or cycloaliphatic oil, such as, for example, castor oil, tung oil, linseed oil, naphthenic oils, etc. As noted, these are commonly referred to as "phosphating oils". Typically, phosphating oils are commercially available products comprising aqueous emulsions of the oils which contain stabilizers, emulsifying agents, and other additives. The phosphating oils are available under a variety of tradenames and trademarks such as Permoil WS from Detrex Chemical; NAPREX which is available from Mobil Oil Corp.; Tectyl ® which is available from Ashland Petroleum Company, and others.

Any of the commercially available phosphating oils work with substantially equal efficacy herein. The siloxanes, as is known to those skilled in the art to which the present invention pertains, are generally prepared by the condensation of silanes to form the characteristics Si—O—Si bond. These siloxanes which are useful herein are the polyalkylsiloxanes and the akylpolysiloxanes, as well as mixtures thereof. Preferably, the siloxanes employed herein are polyalkylsiloxanes wherein the alkyl radical has from about one to four carbon atoms, and mixtures thereof.

It has been found that in the practice of the present invention aminofunctional polyalkylsiloxanes are eminently useful. The aminofunctional polyalkylsiloxanes are commercially available products, such as those sold by Dow Corning under the names DOW CORNING 531 and DOW CORNING 536. These products are described as aminofunctional polydimethylsiloxane copolymers with the following physical properties:

|  | DOW CORNING 531 | DOW CORNING 536 |
| --- | --- | --- |
| Active Ingredients, % | 50 | 100 |
| Solvents | Alphatic Solvents & isopropyl alcohol | none |
| Viscosity at 77° F., cs | 150 | 35 |
| Refractive Index at 77° F. | 1.410 | 1.408 |
| Specific Gravity at 77° F. | 0.860 | 0.985 |
| Flash Point, closed cup, Pensky-Martin Method, °F. | 56 | 60 |

Aminofunctional siloxanes, per se, are described in the literature such as in U.S. Pat. Nos. 3,508,933; 3,836,371, and 3,890,271, as well as Canadian Pat. No. 1,031,485, the disclosures of which are hereby incorporated by reference.

In order to enhance the corrosion resistance of the aminofunctional polysiloxanes they can be further reacted with a simple, as well as fatty acid, such as, for example, acetic acid, stearic acid, isostearic acid, lauric acid, etc., isomers and derivatives thereof as well as mixtures thereof. Preferably, where the acid reaction is used, the siloxane is reacted with a fatty acid. The reaction of aminofunctional polysiloxanes with fatty acids are well known in the art.

In preparing a coating composition hereof, generally, an aqueous solution thereof is employed. The aqueous solution is prepared by admixing the silicone component with the phosphating oil which is ordinarily, an aqueous emulsion thereof. Generally, the resulting coating composition comprises from about 5 to about 25%, by volume, of phosphating oil, from about 0.1 to about 25%, by volume, of siloxane and the balance being water. In preparing the aqueous solution, the oil and siloxane are ordinarily present in a respective volumetric ratio ranging from about 40:1 to about 1:1.

It should be noted with respect hereto that additional ingredients may be incorporated hereinto, such as, emulsifiers, surfactants, solvents, etc. to promote storage storablity, solubility, etc.

It should, also, be noted with respect hereto that the results were unexpected in that the literature advises against mixing a phosphating oil and a polysiloxane.

The coating composition hereof is applied to a metal product, such as a metal fastener or the like, after the metal product has been "phosphated". Again, as is known to those skilled in the art to which the present invention pertains, the "phosphating" of a metal part, which is usually a ferrous part, comprises exposing the part to a hot or heated phosphate solution, such as a hot zinc phosphate, hot phosphoric acid, or a similar hot solution, and, thereafter, cooling it to, thus, passivate the metal fastener.

In applying the coating composition hereof, any useful technique can be employed, such as, immersion, spraying, brushing or the like. Also, the composition during use is employed at a temperature ranging from about 60° F. to about 175° F., and, preferably, from about 70° F. to about 150° F. The elevated temperatures, where used, are employed to promote the solubility of the composition.

For a more complete understanding of the present invention reference is made to the following illustrative examples. The examples are to be construed as illustrative, not limitative, of the present invention.

EXAMPLE I

This example illustrates the efficacy of the present invention in its ability to pass an automotive manufacturing specification which requires painted metal parts to surpass a 240 hour salt spray test after washing with a solution of Dupont's RALLYE car wash at 0.5% concentration.

A series of iron bolts are phosphated by immersion in a heavy zinc phosphate solution. Thereafter, the bolts are rinsed and sealed in a conventional manner. Then, the bolts are dried and next painted with a black paint (55 second viscosity). After painting, the bolts are oven cured at 350° F. until dry. The bolts, after curing, are immersed in an aqueous coating solution of:

(a) 20% by volume of a phosphating oil sold by Detrex Chemical under the name PERMOIL WS;

(b) 20% by volume, of an aminofunctional polydimethylsiloxane solution containing about 7% by volume of the siloxane, and (c) 60%, by volume, of water.

After immersion, the bolts are air dried for 24 hours at room temperature.

Next, the bolts are washed in a 1/2% concentration aqueous RALLYE car wash solution. The bolts are, then, rinsed in tap water and air blown dry.

Thereafter, the bolts are placed in a 22" Harshaw Salt Spray Cabinet. After 312 hours in the cabinet the bolts show no signs of rust.

In conducting this example, the aminofunctional polydimethylsiloxane employed is a commercially available product sold under the name POLYBRITE which has substantially the following composition:

| INGREDIENT | AMT, pbw |
| --- | --- |
| Dow Corning DC 536 | 6.0 |
| Dow Corning DC 531 | 2.0 |
| Isostearic Acid | 0.6 |
| Emulsifier[1] | 1.0 |
| Solvent[2] | 46.4 |
| Water | 64.0 |

[1] an alkanolamide emulsifier sold under the name WITCAMIDE 511.
[2] a mixture of kerosene and mineral spirits.

EXAMPLE II

Example I is repeated using the Permoil WS and an aminofunctional dimethylsiloxane aqueous solution which is prepared from the following:

| INGREDIENT | AMT, pbv |
| --- | --- |
| Dow Corning DC 536 | 2.0 |
| Isostearic Acid | 1.0 |
| Emulsifier[1] | 1.0 |
| Stoddard Solvent | 34.0 |
| Water | 62.0 |

[1] Witcoamide 511.

In preparing this composition, the acid is added to the siloxane and mixed therewith for about fifteen minutes. During this time period, an exothermic reaction occurs and is completed. Thereafter, the emulsifier is added to the siloxane and acid mixture. Next, the solvent and, then, the water is added thereto. The resulting aqueous system is then, added to the PERMOIL WS to form a 20%: 20%: 60%, by volume, solution.

Bolts treated in accordance herewith showed no rust after 240 hours in the salt spray cabinet.

EXAMPLE III

Example I is repeated, except that the paint step is eliminated. Using twelve bolts as the metal parts, after 240 hours in the cabinet, only two bolts show light rust. The remaining ten bolts show no rust after 336 hours in the cabinet.

EXAMPLE IV

Example I is repeated but using an aqueous solution of 10% by volume of Permoil WS, 10% by volume of the siloxane solution and 80% by volume of water. The so-treated bolts begin evidencing rust at 144 hours. When repeated with different molecular weight aminofunctional dimethylsiloxane, the bolts showed rusting after 168 hours in the cabinet.

EXAMPLE V

Example V is repeated, but using a coating composition of 10% PERMOIL WS phosphating oil, 20% by volume of the aminofunctional dimethylsiloxane solution identified in Example I and 70% by volume of water. Bolts so tested show light rusting after 168 hours in the salt spray cabinet.

EXAMPLE VI

Example I is repeated, but in lieu of the siloxane, an equal amount of an acrylic wax sold under the name FUTURE is substituted therefor. After 48 hours in the cabinet the bolts are rusted.

It is to be appreciated that by the practice of the present invention significant improvements in corrosion resistance are achieved.

Having thus, described the invention, what is claimed is:

1. An aqueous coating composition for improving corrosion resistance of metal parts, consisting essentially of:
   (a) a phosphating oil,
   (b) an aminofunctional alkylpolysiloxane or aminofunctional polyalkylsiloxane, and
   (c) water.
2. The composition of claim 1 wherein the siloxane is an aminofunctional polyalkylsiloxane.
3. The composition of claim 2 wherein the siloxane is an aminofunctional dimethylsiloxane.
4. The composition of claim 2 wherein the siloxane is the reaction product of an aminofunctional polyalkylsiloxane and a fatty acid.
5. The composition of claim 4 wherein the siloxane is an aminofunctional dimethylsiloxane and the acid is isostearic acid.
6. The composition of claim 1 which comprises:
   (a) from about 5% to about 35%, by volume, of the phosphating oil,
   (b) from about 0.1% to about 25%, by volume, of the siloxane, and
   (c) from about 90% to about 50%, by volume, of water.
7. The composition of claim 6 wherein the oil and the siloxane are present in a respective volumetric ratio ranging from about 40:1 to about 1:1.
8. The composition of claim 7 wherein:
   (a) the phosphating oil is a naphthenic oil, and
   (b) the siloxane is the reaction product of aminofunctional dimethylsiloxane and isostearic acid.
9. The composition of claim 1 which further includes:
   (a) an emulsifier for promoting oil-in-water solutions and
   (b) organic solvents.
10. A method for improving the corrosion resistance of a metal, comprising:
    (a) passivating the metal with a phosphate solution, and
    (b) coating the phosphated metal with an aqueous coating composition consisting essentially of:
        (1) a phosphating oil,
        (2) an aminofunctional alkylpolysiloxane or an aminofunctional polyalkylsiloxane, and
        (3) water.
11. The method of claim 10 wherein the siloxane is an aminofunctional polyalkylsiloxane.
12. The method of claim 11 wherein the siloxane is an aminofunctional dimethylsiloxane.
13. The method of claim 10 wherein the siloxane is the reaction product of an aminofunctional polyalkylsiloxane and a fatty acid.
14. The method of claim 13 wherein the siloxane is the reaction product of an aminofunctional dimethylsiloxane and isostearic acid.
15. The method of claim 10 wherein the coating composition comprises:
    (a) from about 5% to about 35%, by volume, of the phosphating oil,
    (b) from about 0.1% to about 25%, by volume, of the siloxane, and
    (c) from about 90% to about 50%, by volume, of water.
16. The method of claim 15 wherein the phosphating oil and the siloxane are present in a respective volumetric ratio ranging from about 40:1 to about 1:1.
17. The method of claim 16 wherein:
    (a) the phosphating oil is a naphthenic oil, and
    (b) the siloxane is the reaction product of an aminofunctional dimethylsiloxane and isostearic acid.
18. The method of claim 17 wherein the aqueous coating composition is maintained at a temperature ranging from about 60° F. to about 175° F.
19. The method of claim 10 wherein the aqueous coating composition is maintained at a temperature ranging from about 60° F. to about 175° F.
20. A metal part treated in accordance with the method of claim 10.
21. A metal part treated in accordance with the method of claim 19.

* * * * *